United States Patent [19]
Kobayashi et al.

[11] Patent Number: 6,148,415
[45] Date of Patent: Nov. 14, 2000

[54] BACKUP SWITCHING CONTROL SYSTEM AND METHOD

[75] Inventors: Atuo Kobayashi, Atsugi; Yasuhiro Ishii, Hadano, both of Japan

[73] Assignees: Hitachi, Ltd., Tokyo; Hitachi Computer Engineering Co., Ltd., Kanagawa-ken, both of Japan

[21] Appl. No.: 08/258,235

[22] Filed: Jun. 10, 1994

[30] Foreign Application Priority Data

Jun. 11, 1993 [JP] Japan ................................. 5-140449

[51] Int. Cl.$^7$ ............................. H02H 3/05; G11C 29/00
[52] U.S. Cl. ............................... 714/15; 714/723; 714/13
[58] Field of Search ........................... 395/575; 371/9.1;
714/4, 3, 13, 15, 723

[56] References Cited

U.S. PATENT DOCUMENTS

| | | | |
|---|---|---|---|
| 4,819,232 | 4/1989 | Krings | 371/9 |
| 5,111,384 | 5/1992 | Aslanian et al. | 395/575 |
| 5,157,663 | 10/1992 | Major et al. | 371/9.1 |
| 5,202,980 | 4/1993 | Morita et al. | 395/575 |
| 5,255,367 | 10/1993 | Bruckert et al. | 395/200 |
| 5,307,481 | 4/1994 | Shimazaki et al. | 395/575 |

FOREIGN PATENT DOCUMENTS

| | | | |
|---|---|---|---|
| 54-30383 | 3/1979 | Japan | G05B 7/02 |
| 54-107242 | 8/1979 | Japan | G06F 15/46 |
| 55-789970 | 11/1982 | Japan | G06F 11/20 |
| 57-111752 | 12/1982 | Japan | G06F 11/20 |
| 63-75843 | 4/1988 | Japan . | |
| 2032149A | 4/1980 | United Kingdom | G06F 11/20 |

OTHER PUBLICATIONS

Katsuki et al., Pluribus—An Operational Fault–Tolerant Processor, Proceedings of the IEEE, Oct. 1978, at 1146.
Gaertner at al., Architecture for a Highly Reliable Parallel Computer System, Gaertner Research, Oct. 1975, at Abstract.
Schulman, Stalking GP Faults: Parts II, Dr. Dobb's Journal, Feb. 1990, at 76.

*Primary Examiner*—Norman Michael Wright
*Attorney, Agent, or Firm*—Mattingly, Stanger & Malur, P.C.

[57] ABSTRACT

One or more combinations of an operating data processing machine and a backup data processing machine are connected together to enable backup switching wherein the backup machine takes over the data processing from the operating machine when a failure occurs in the operating machine. In particular, each of the operating and backup machines is connected to one or several system resources, such as data storage or data output devices. The operating processor exclusively occupies the system resources, and when a failure occurs the operating processor is disconnected therefrom. A disconnection completion notice is sent to the backup processor, which then begins to exclusively occupy the system resources for performing ongoing data processing that would have been performed by the operating processor had the failure not occurred. When a failure occurs with the operating processor, the data being processed and the data concerning the failure are dumped to an auxiliary memory to facilitate analysis of the failure. Once the failed operating processor is returned to service, it functions as a backup processor that is switched to take over the data processing when a failure occurs in the new operating processor.

21 Claims, 7 Drawing Sheets

BACKUP SWITCHING CONTROL SYSTEM AND METHOD

FIELD OF THE INVENTION

The present invention relates to a system and method in a data processing system for controlling the switching between an operating machine and a backup machine within the system. More particularly, the invention relates to controlling the backup switching between substantially similar operating and backup machines when the operating machine becomes faulty so that the backup machine takes over the processing from the faulty operating machine automatically, rapidly, reliably and economically.

BACKGROUND OF THE INVENTION

There exist data processing or computer systems operating under a backup control scheme wherein a backup processor takes over from the operating processor if the latter develops a failure. For example, in Japanese Patent Laid-Open No. 75843/1988, there is a backup switching scheme involving a backup CPU for detecting a failure of an operating CPU that sends a break signal to the operating CPU (e.g., "000 . . . 0") via a serial interface. In turn, the operating CPU performs a suitable function to measure the bit length of the break signal, and then attempts to recover from the failure by issuing an interrupt signal and a reset signal. If the attempt to remedy the failure is unsuccessful, the failed CPU disconnects from the system.

SUMMARY OF THE INVENTION

In the conventional backup switching method outlined above, only one operating machine is backed up per serial line connection between the machines. That is, one backup machine is assigned to each operating machine. One disadvantage of this conventional technique is that it makes system setup of the backup machines for a computer system uneconomical. Another disadvantage results from a significant reduction in system availability once a failure occurs because of a prolonged system down time produced by a recovery process that must be completed before the backup machine can take over from the failed machine. A further disadvantage is that in the recovery process there is a loss of information about the primary failure that triggered the disconnection of the failed machine from the system.

It is therefore an object of the present invention to overcome the above and other deficiencies and disadvantages of the prior art by providing a backup switching control method which automates switching from an operating machine to a backup machine; prevents the communication conflict or contention between the operating and the backup machines with respect to switching over control of the system resources; automates acquisition and/or storage of failure information about the machine that experiences a failure; permits rapid switching to a backup machine; and decreases the expense or cost of the backup switching system by backing up a plurality of operating machines with a plurality of backup machines.

In achieving the foregoing and other objects of the present invention, there is provided a backup switching control method for use with a system comprising an operating processor and a backup processor having synchronizing means and failure information storing means each, both means being utilized during backup processing. The operating and backup processors placed under this backup switching control method each have a switching mechanism for exchanging therebetween a disconnection command, a dump acquisition command and a disconnection complete notice. The switching mechanism includes a reset function for forcing the currently operating processor to release the system resources it occupies. Also included in the switching mechanism is a time counting function for monitoring the time required from the receipt of a disconnection command by the operating processor to the output of a disconnection complete notice therefrom so that if the disconnection complete notice is not recognized within a predetermined period of time, the operating processor is reset.

Equipped with the means outlined above, the system under the backup switching control method of the invention allows the backup processor to take over from the operating processor when the backup processor judges the operating processor to be inoperative and when the backup processor has verified that the operating processor has released the system resources it occupied.

Specifically, the backup processor has its switching mechanism initially transmit a disconnection command and a dump acquisition command to a target operating processor via the switching mechanism of the latter. Upon receipt of the disconnection command, the switching mechanism of the operating processor forwards the command to the latter and starts counting the elapsed time until the output of a disconnection complete notice from the operating processor. In accordance with the disconnection command and the dump acquisition command forwarded from the backup processor, the operating processor releases the system resources it has used and dumps failure information by data transfer to an auxiliary storage external of the operating processor. The release of the system resources and execution of the failure information dump process proceed concurrently or in parallel under suitable control of the operating system or a backup switching control system associated therewith. Upon completion of the disconnection from the system, the operating processor notifies the backup processor of the completion of the disconnection. If the operating processor fails to complete the disconnection process within a predetermined period of time, the switching mechanism of the operating processor triggers a reset and notifies the backup processor of the completion of the forced disconnection. On receiving the disconnection completion notice, the backup processor utilizes the released system resources and takes over the processing from the now-failed operating processor. The disconnected processor then undergoes failure checks and, when the cause of the failure is overcome, stands by as a newly functioning backup processor that is ready to take over from the currently operating processor. In this manner, the backup switching procedure is automated and the communication conflict or contention between the operating and the backup processors for the system resources is prevented. In addition, by the present invention switching to the backup processor is executed quickly.

DETAILED DESCRIPTION OF THE PREFERRED EMBODIMENTS

Figure 1:
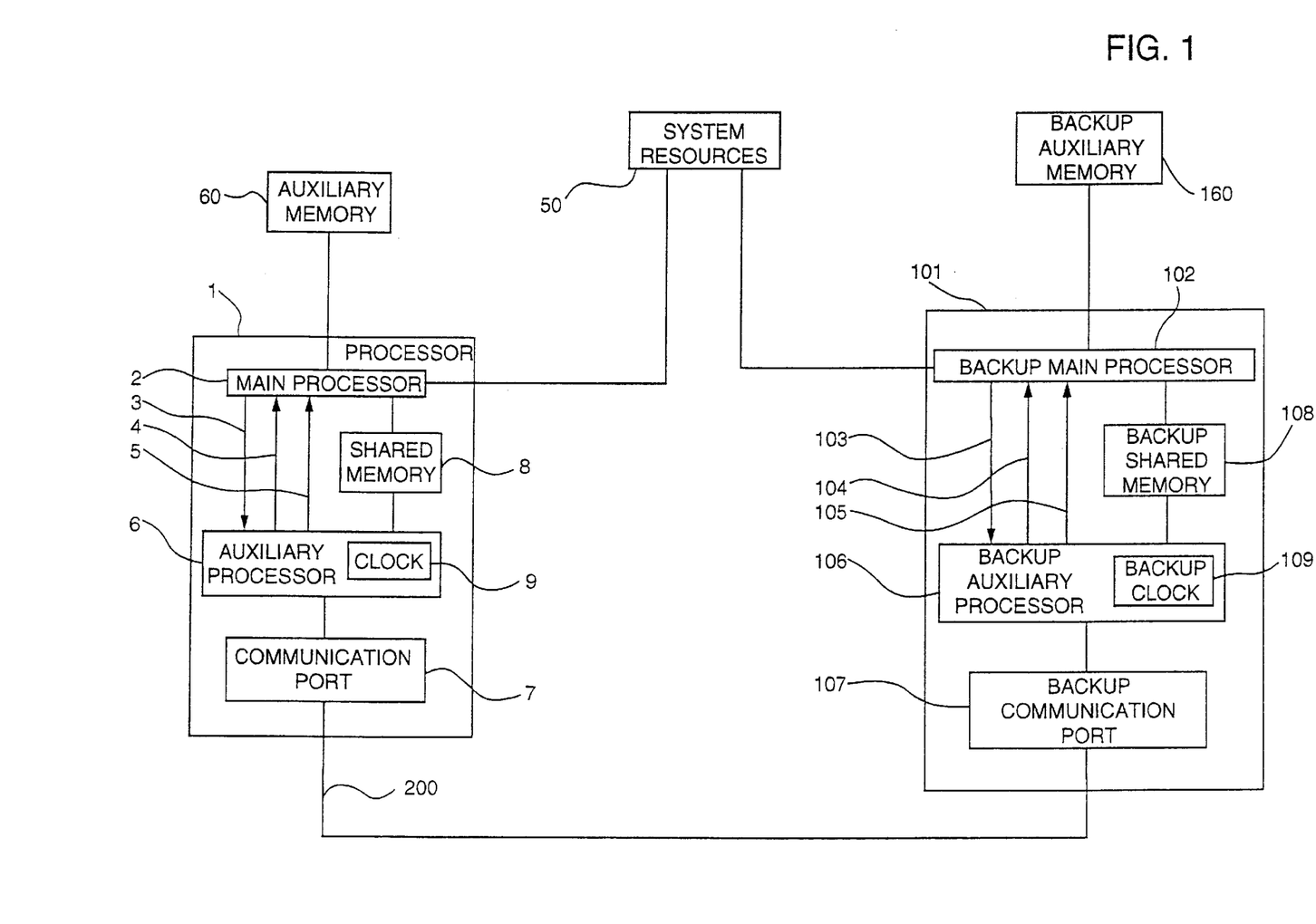
FIG. 1 is a block diagram of a backup processor switching control system according to a first embodiment of the present invention.

FIG. 1 shows the backup system of the invention which includes an operating data processor or machine 1 and a backup data processor or machine 101 placed under the backup switching control method of the invention. Processor 1 includes a main processor 2 and an auxiliary processor 6. Communication connections between the main processor 2 and the auxiliary processor 6 include an interrupt signal 3 sent from the main processor 2 to the auxiliary processor 6 and an interrupt signal 4 sent from the auxiliary processor 6 to the main processor 2. A shared memory 8 is connected to both processors 2 and 6 for reading and writing data. Main processor 2 also has memory that is not shared with the auxiliary processor 6, as well as registers, for storing data being processed. The processor 1 is arranged to be reset when a reset signal 5 is sent from the auxiliary processor 6 to the main processor 2. The auxiliary processor 6 includes a clock 9 and a communication port 7 connected with a communication channel 200.

The embodiment of the invention shown in FIG. 1, includes one operating data processor and one backup data processor, each having a substantially identical configuration at least with respect to the inclusion in each of a main processor, auxiliary processor, shared memory and communication port. Auxiliary processor 6 and backup auxiliary processor 106 generally monitor such ambient conditions as temperature and supply voltage levels. In this embodiment, the auxiliary processors are used to control switching between the backup processor and the operating processor upon failure of the latter. The auxiliary processors communicate with each other over a communication channel or network 200 through the communication port 7 and a backup communication port 107. The communication channel 200 may be either a wired channel or a wireless channel.

In the event that the processor 1 develops a failure while utilizing system resources 50 (one or more of a hard disc drive, printer, magnetic tape unit, etc.), switching to the backup processor 101 takes place through the execution of the backup switching procedures described below with reference to flowcharts of FIGS. 3 through 7.

Figure 3:
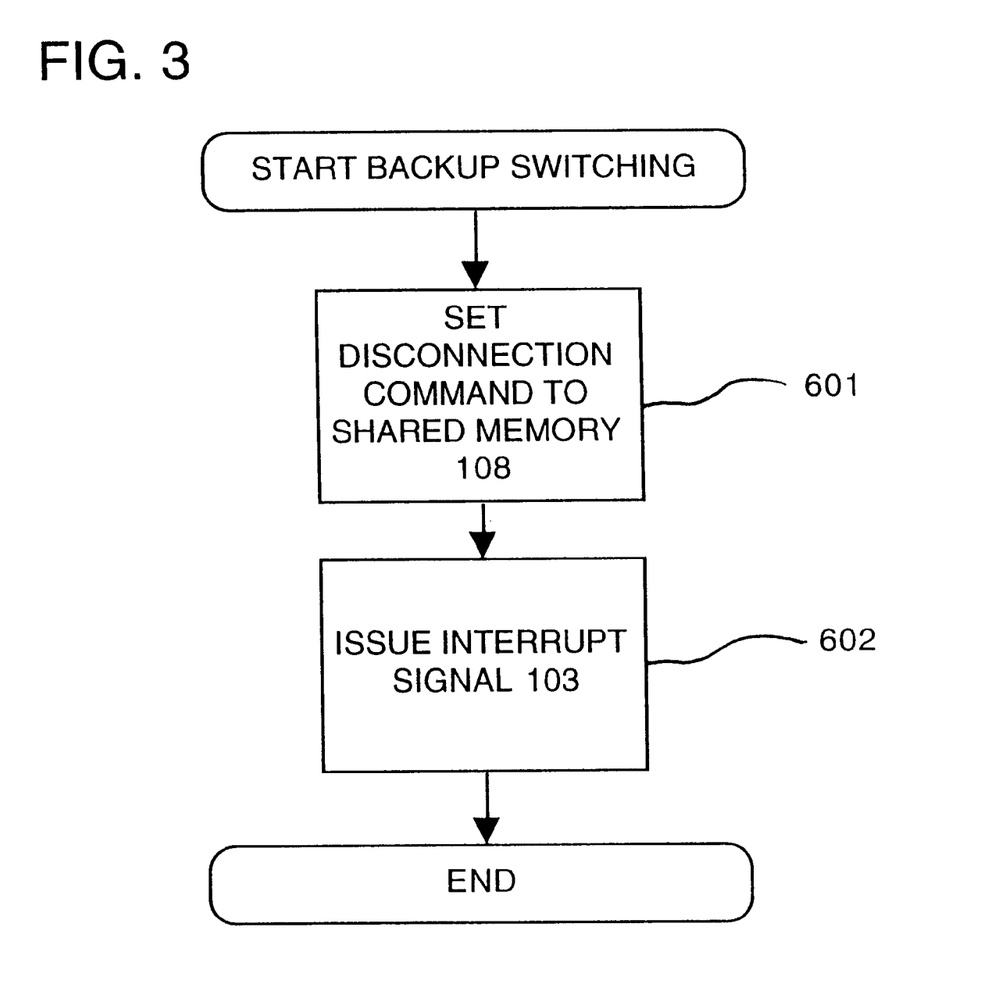
FIG. 3 is a flowchart showing the steps performed in an initial phase of the backup switching control method according to the present invention.
Figure 4:
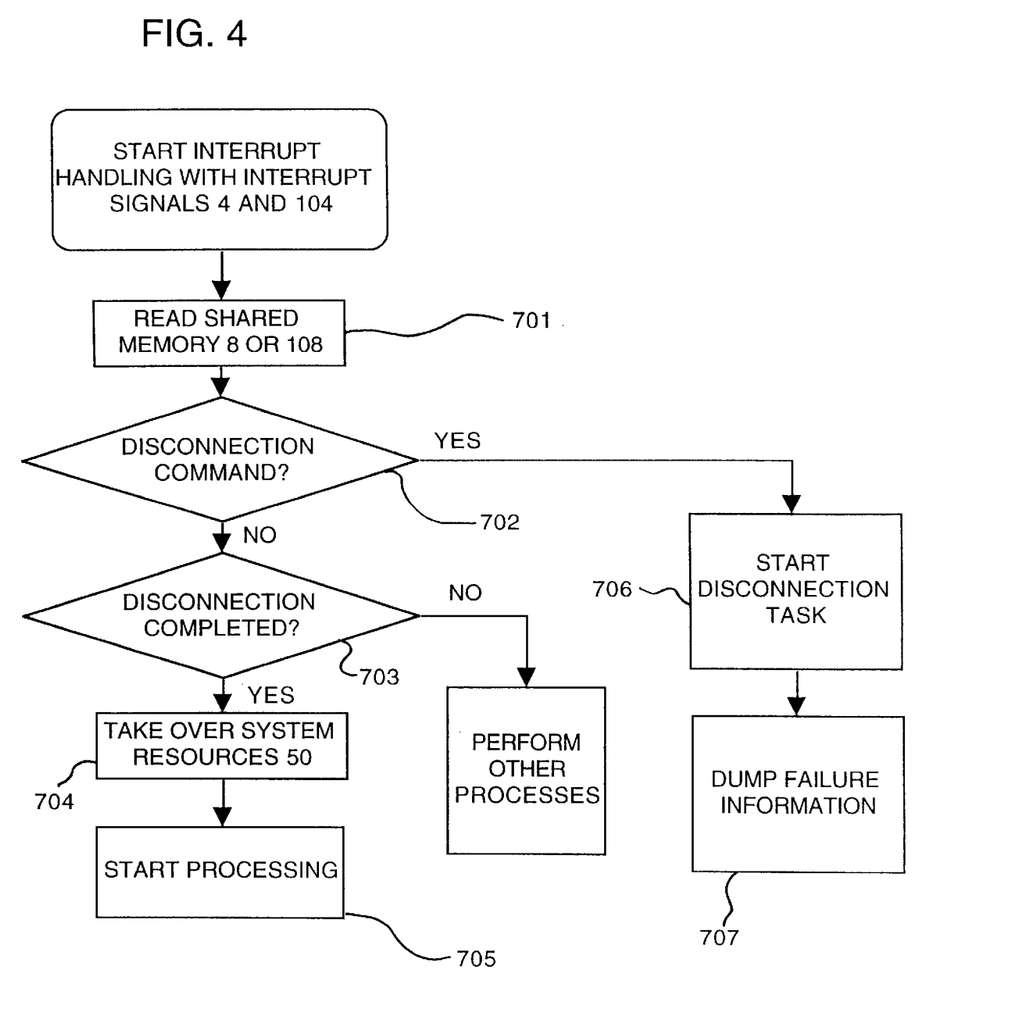
FIG. 4 is a flowchart of the interrupt handling involving the main processors in both the operating and the backup processors.
Figure 5:
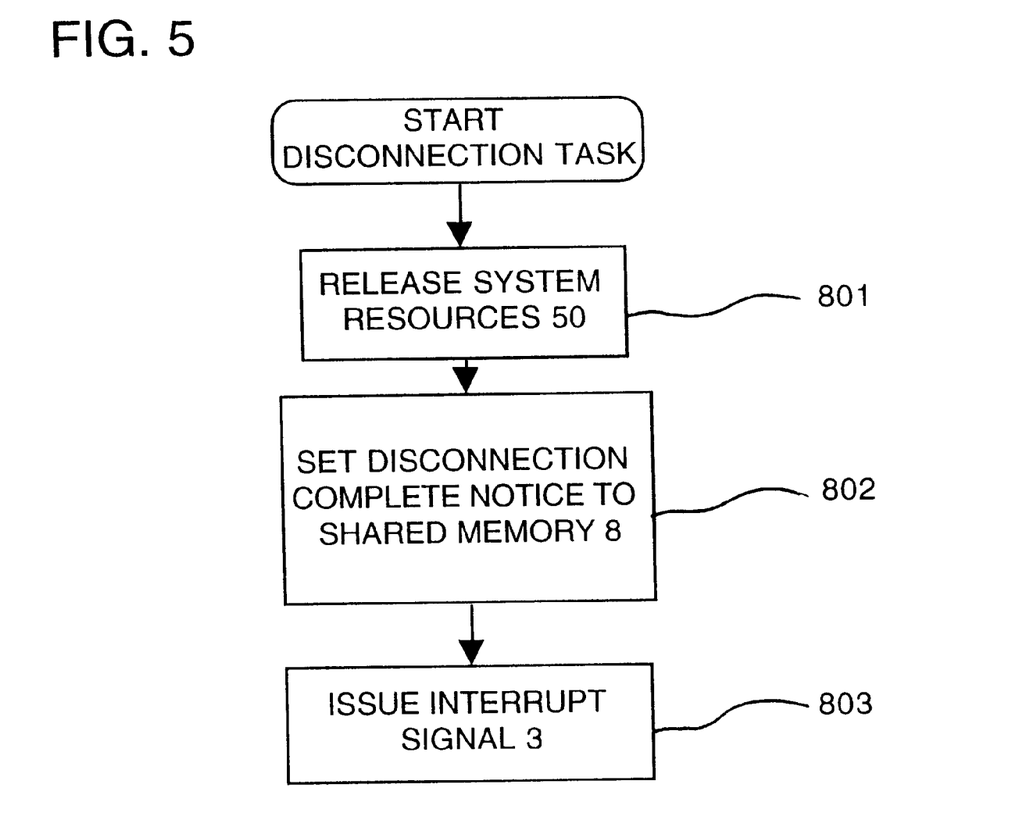
FIG. 5 is a flow chart of the steps followed in the disconnection task processing.
Figure 6:
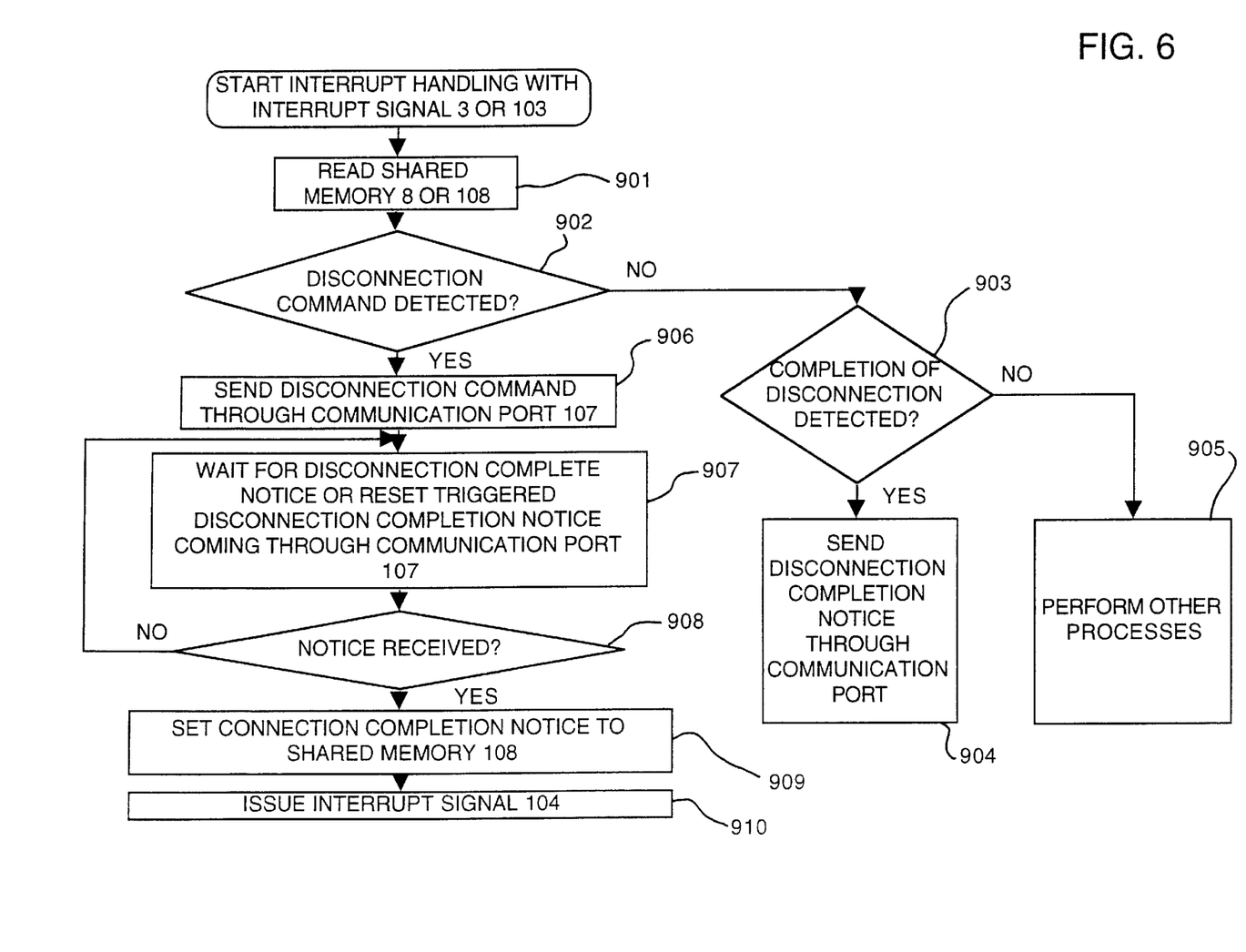
FIG. 6 is a flowchart of the interrupt handling involving the auxiliary processors in both the operating and the backup processors.
Figure 7:
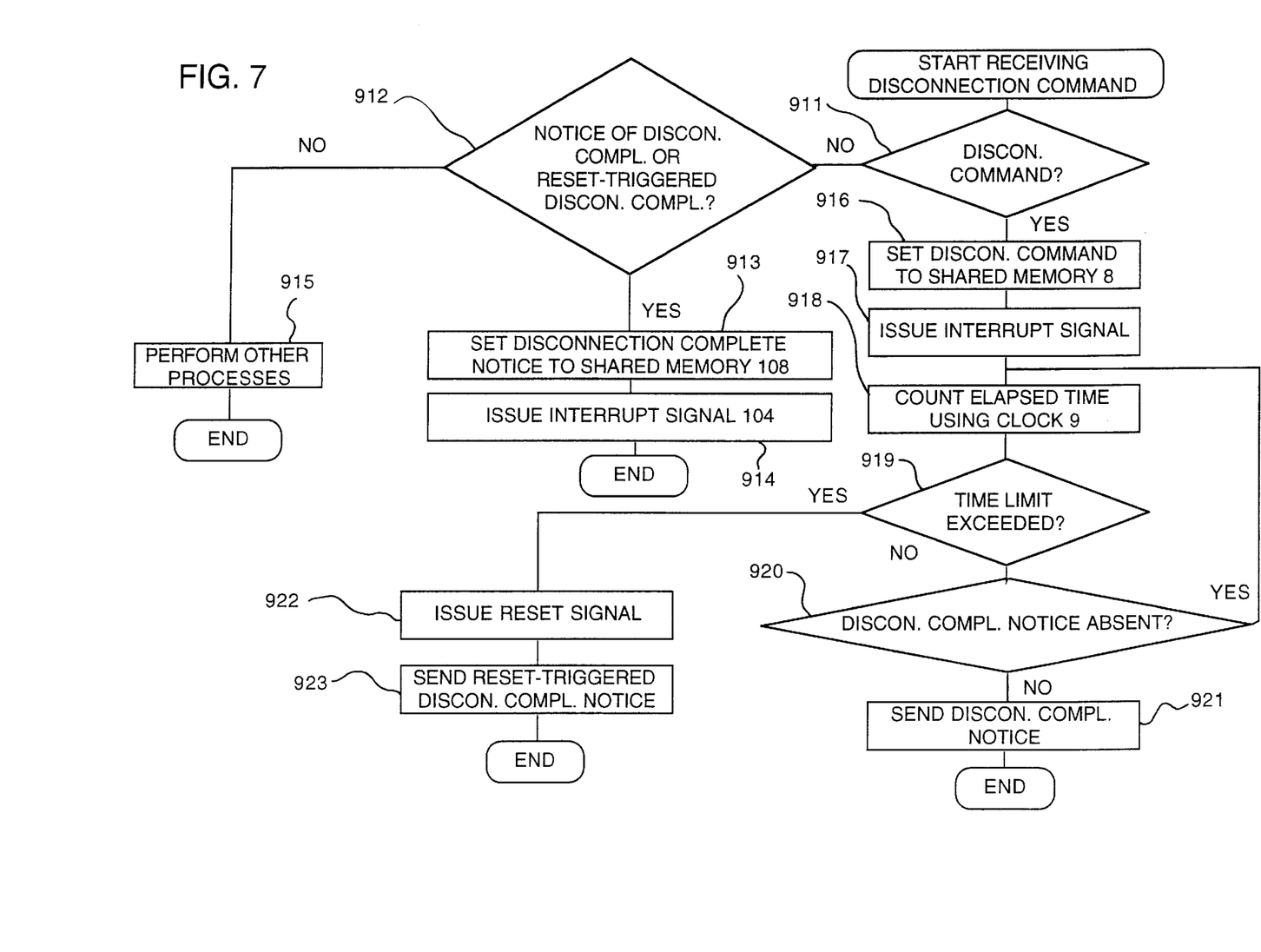
FIG. 7 is a flowchart of the steps followed in the handling of notices communicated through the communication ports of the auxiliary processors.

The backup processor 101 starts disconnecting the operating processor 1 using the procedure of FIG. 3 and completes the disconnection process with the procedure of FIG. 4. It should be noted that the disconnection task processing of FIG. 5 is carried out in parallel with the failure information dump processing of FIG. 4 under control of the operating system of the main processor 2. Although the disconnection command of this embodiment also functions as a dump acquisition command, alternatively it is possible to separate the dump acquisition command from the disconnection command, whereby the contents of the shared memory can be separated from notices exchanged between the auxiliary processors.

In the preferred embodiment of the backup control system and method of the invention, a backup main processor 102 of the backup processor 101 monitors the operation of operating processor 1 for the purpose of detecting when a failure occurs in the operating processor. When such a failure occurs, backup main processor 101 writes to a backup shared memory 108 a disconnection command with which to disconnect the operating processor 1 (step 601 of FIG. 3). After this, an interrupt signal 103 is issued to the backup auxiliary processor 106 (step 602). On detecting the interruption, the backup auxiliary processor 106 reads the backup shared memory 108 (step 901 of FIG. 6). When the backup auxiliary processor 106 retrieves from the memory 108 the disconnection command with which to disconnect the operating processor 1 (step 902), the backup auxiliary processor 106 sends a disconnection command to the auxiliary processor 6 of the operating processor 1 using the backup communication port 107 and via the communication channel 200 (step 906). On receiving the disconnection command through the communication port 7 (step 911 of FIG. 7), the auxiliary processor 6 of the operating processor 1 writes the disconnection command to the shared memory 8 (step 916). Thereafter, the auxiliary processor 6 issues the interrupt signal 4 to the main processor 2 (step 917) and uses the clock 9 to count the elapsed time (step 918).

The system of the invention operates in response to non-catastrophic failures in the operation of the operating processor, for example operational failures occurring in the execution of application software as a result of software or hardware error. When such a failure is minor enough for the main processor 2 to accept the interrupt signal 4, the contents of the shared memory 8 are read (step 701 of FIG. 4). If what is read out is found to be the disconnection command (step 702), the disconnection task processing is started (step 706). The main processor 2 then disconnects itself from the system resources 50 (step 801 of FIG. 5) and concurrently dumps failure information, which includes data in a memory of main processor 2, and data being processed in the registers of the main processor 2 to an auxiliary storage device 60 (step 707). Auxiliary storage device 60 may be a hard disk, DAT or the like. When the system resources 50 are disconnected (step 801), a disconnection complete notice is written to the shared memory 8 (step 802). Thereafter, the interrupt signal 3 is issued to the auxiliary processor 6 (step 803) by the main processor 2.

When the auxiliary processor 6 detects the interrupt signal 3 and receives the disconnection complete notice from the shared memory 8 within a predetermined period of time (step 920 of FIG. 7), the auxiliary processor 6 transmits a disconnection complete notice to the auxiliary processor 106 of the backup processor 101 through the communication port 7 and via the communication channel 200 (step 921). If the auxiliary processor 6 fails to detect the completion of the disconnection triggered by the interrupt signal 3 within the predetermined period of time (i.e., if 5 seconds, for example) elapses as determined by clock 9 and time is up without the disconnection completion notice being detected), the reset signal 5 is used to reset the main processor 2 (step 922). A reset-triggered disconnection complete notice is then transmitted to the auxiliary processor 106 in the backup processor 101 through the communication port 7 and via the communication channel 200 (step 923).

When the auxiliary processor 106 in the backup processor 101 receives the disconnection complete notice or reset-triggered disconnection complete notice through the communication port 107 (step 908 of FIG. 6), the auxiliary processor 106 sets the disconnection complete notice to the shared memory 108 (step 909). The auxiliary processor 106 then issues an interrupt signal 104 to the main processor 101 to inform the latter of the completion of the disconnection of the main processor 2 from the system resources 50 (step 910). Since the dump process may take a long time, one object of the invention is to control the switching of the failed operating processor to release the shared resources 50 and subsequently transmit the disconnection completion notice to the backup processor independently of completion of the dumping of the data by the main processor 2 to an external memory, e.g. auxiliary memory 60.

When the main processor 102 detects the interrupt signal 104 and receives the disconnection completion notice from the shared memory 108 (step 703 of FIG. 4), the main processor 102 takes over or exclusively occupies the system resources 50 and starts to carry out the data processing operations that would have been performed by the operating processor had the failure not occurred. As a result, the backup processor becomes a new operating processor that takes over from the now-failed operating processor in a short amount of time, not dependent on the completion of the dump processing. And further as a result, communication conflict between the operating and backup processors regarding the use of the system resources is avoided. A reset signal 105, a clock 109 and an auxiliary storage 160 of the backup processor are to be used when and if the newly operating processor (101) develops a failure and is replaced by a new backup processor (1), the switching therebetween taking place in the same manner as previously described. Accordingly, the disconnected processor (1) becomes the new backup processor after recovery from the failure that disabled it. If the new operating processor (101) fails, the remedied backup processor (1) is switched over in accordance with the present invention to again become the operation processor.

In the foregoing embodiment of the system and method of the invention, as described, two processors of substantially identical configuration can alternately function as the operating and backup processors.

Another embodiment of the invention will now be described with reference to a backup processor system shown in FIG. 2 having a plurality of operating data processors or machines 300, 301, . . . , 302 that are respectively connected to a corresponding plurality of backup data processors or machines 400, 401, . . . , 402 via a common communication channel 500. Each of the operating and backup machines are assigned a specific address. A particular operating machine is combined selectively with a particular backup machine by use of their addresses. Communication between the machines is effected on a local area network (LAN) basis.

Figure 2:
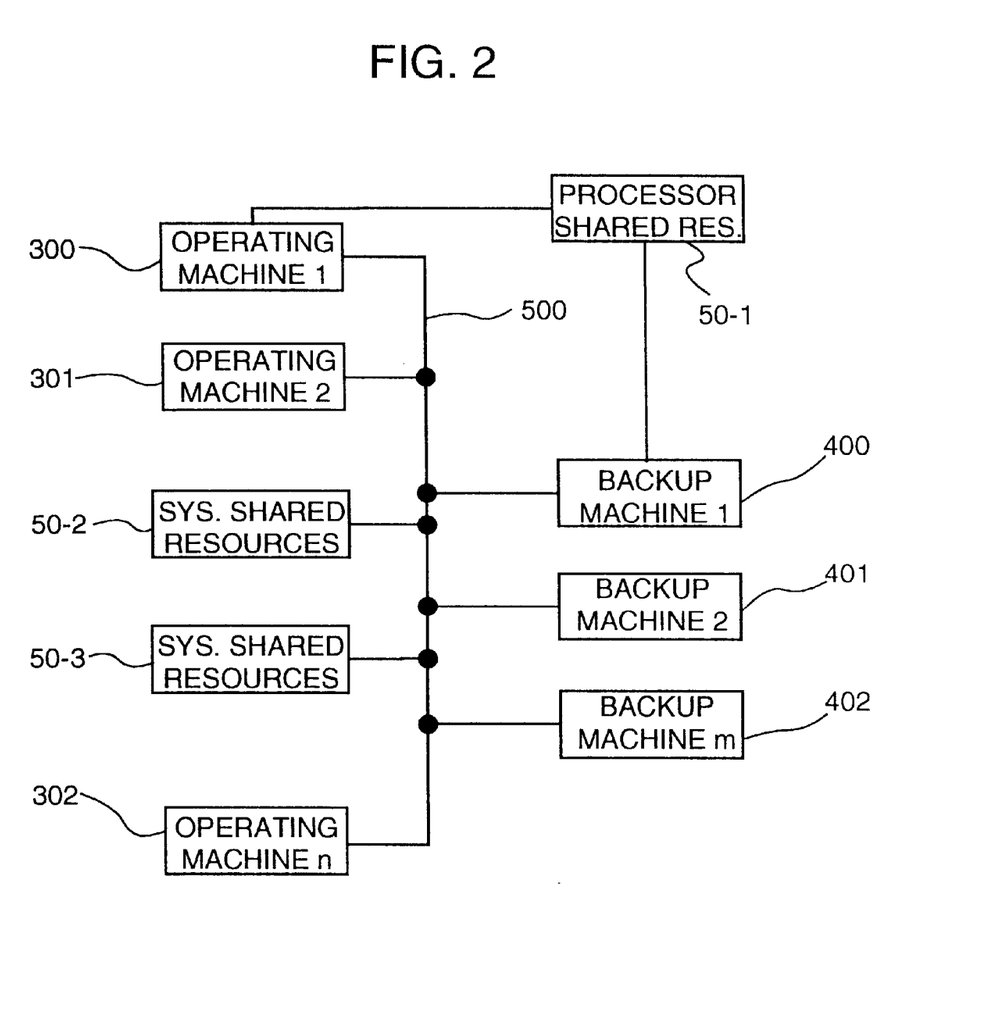
FIG. 2 is a block diagram of a backup processor switching control system according to a second embodiment of the present invention.

As shown in FIG. 2, operating machine 300 and backup machine 400 share system resources 50-1, 50-2 and/or 50-3. System resources 50-1 are of the type connected directly between a designated combination of an operating machine 300 and a backup machine 400, while on the other hand, system resources 50-2 and 50-3 are directly connected to the network or communication channel 500 for use by one or more of the operating machines and functioning backup machines that have been switched into service in place of a failed operating machine.

During operation of the operating machines 300, etc., the status of operation is monitored so that the backup machines will be notified when a corresponding operating machine has a failure, such as an application program software failure or non-catastrophic hardware failure. As one example, the paired operating and backup machines can be directly connected to each other or indirectly connected through communication channel 500 so that a continuous checking of the status of the operating processor by the backup processor can be maintained and a notification of a failure of the operating processor transmitted to the backup processor through the connection thereof. In another example, the operating and backup processors may be connected to a service processor that monitors the operating condition of all of the operating machines so as to determine when a failure occurs with one of them. In this case, the failure would be communicated to the appropriate backup machine by the system machine or processor. The manner of determining whether a failure has occurred or not and of communicating or notifying the backup processor of the failure can be accomplished in any conventional manner.

In the multiple machine system of this embodiment, the switching between a given combination or pair of operating and backup machines is executed in the same manner as described above for the first embodiment of the invention by using communication channel 500 or another suitable connection between the respective machines, not shown, for sending and receiving the notices and other data between their communication ports.

According to the embodiments of the invention, the backup processor has its auxiliary processor take over the processing of the currently operating processor when the latter releases the system resources needed to carry out the processing of the system. This prevents duplicate use of the system resources by the operating and the backup processors upon switching and thus optimizes the timing of the backup switching. According to the system and method of the invention, it is possible to control the backup switching for a one-operating, one-backup machine system and also for a backup system involving a plurality of operating machines and a plurality of backup machines, all machines being substantially identically configured and connected to a common network or other interconnection. A highly economical backup system can be configured depending on the availability required for the system.

In the case of switching to the backup machine upon a failure of the operating machine, the failed machine can assume its new role of a backup as soon as it recovers from the failure, with no interruption in the processing of the system. This also contributes to improving the availability of the system. Since failure information about the failed operating machine is automatically dumped, the timely information thus acquired facilitates the effort of troubleshooting. Even when large amounts of failure information about the failed operating machine are dumped over an extended period of time, the backup machine can take over the processing of the system without waiting for the dump to end. These features combine to enhance the economy and versatility of the backup system considerably.

We claim:

1. A backup switching control method for use with a system having at least one system resource, at least one operating data processor exclusively occupying said system resource for processing data within said system including at least one of inputting, outputting and storing data with said at least one system resource, and at least one backup processor which takes over said data processing from said operating processor when a failure of said operating processor occurs, comprising the steps of:

connecting said operating processor, said backup processor and said system resource together for communication therebetween;

said operating processor and said backup processor each performing a switching control function including sending a system disconnection command and a dump acquisition command from said backup processor to said operating processor, and further for sending a disconnection complete notice from said operating processor to said backup processor;

transmitting said dump acquisition command and said disconnection command to said operating processor from said backup processor when a failure occurs in said operating processor, said operating processor executing a dump process in response to receiving said dump acquisition command that dumps data externally of said operating processor and executing a disconnection process in response to receiving said disconnection command independently of the completion of said dump process;

wherein said operating processor outputs to said backup processor the disconnection complete notice once said operating processor is disconnected from said system and whereby said backup processor, after receiving said disconnection complete notice, takes over the data processing from said operating processor including occupying said at least one system resource for performing ongoing processing within said system.

2. A backup switching control method according to claim 1, wherein said dump process executed by said operating processor dumps data being processed in registers of said operating processor, and data stored in a memory of said operating processor to an auxiliary storage concurrently with said executing of said disconnection process.

3. A backup switching control method according to claim 1, further including executing a time counting function and a processor resetting function that monitors the time required from the receipt of said disconnection command by said operating processor to the output of said disconnection complete notice so that if said disconnection complete notice is not recognized within a predetermined period of time, said operating processor is reset by said processor resetting function.

4. A backup switching control method according to claim 3, further including notifying said backup processor upon the resetting of the operating processor when said processor resetting function is executed.

5. A backup switching control method according to claim 1, wherein said output of said disconnection completion notice is output upon completion of the disconnection independently of the executing of the dump process.

6. A backup switching control method according to claim 1, wherein said backup processor, upon initiating the ongoing processing of the failed operating processor, functions as a new operating processor, and said disconnected processor functions as a backup processor when the disconnected processor has recovered from the failure.

7. A backup switching control method according to claim 1, further comprising controlling a plurality of combinations of said operating and said backup processors, wherein said connecting includes connecting said plurality of combinations of processors together in a network, and further wherein said at least one system resource includes one of at least one system resource connected for each said combination of processors, at least one system resource connected to the network for access by any of said operating processors of said combination of processors.

8. A backup switching control method in a computer system, comprising:

connecting a plurality of combinations of operating machines and backup machines to a network, wherein said backup machines take over said data processing from said operating machines when a failure of a corresponding one of said operating machines occurs for each said combination, respectively;

providing at least one system resource for each said combination connected to corresponding ones of said operating and backup machines either directly or through said network, wherein said operating machines exclusively occupy said system resources for processing data within said system including at least one of inputting, outputting and storing data with said system resources;

for each said combination, said operating machine and said backup machine performing a switching control function including sending a system disconnection command and a dump acquisition command from said backup machine to said operating machine, and further for sending a disconnection complete notice from said operating machine to said backup machine; transmitting said dump acquisition command and said disconnection command to said operating machine from said backup machine when a failure occurs in said operating machine, said operating machine executing a dump process in response to receiving said dump acquisition command that dumps data externally of said operating machine and executing a disconnection process in response to receiving said disconnection command independently of the completion of said dump process; wherein said operating machine outputs to said backup machine the disconnection complete notice once said operating machine is disconnected from said system and whereby said backup machine, after receiving said disconnection complete notice, takes over the data processing from said operating machine including occupying said system resources for performing ongoing processing within said system.

9. A backup switching control method according to claim 8, wherein said dump process executed by each said operating machine dumps data and stored in registers and in memory to an auxiliary storage concurrently with said executing of said disconnection process.

10. A backup switching control method according to claim 8, further including executing a time counting function and a machine resetting function that monitors the time required from the receipt of said disconnection command by said operating machine to the output of said disconnection complete notice so that if said disconnection complete notice is not recognized within a predetermined period of time, said operating machine is reset by said machine resetting function.

11. A backup switching control method according to claim 10, further including notifying said backup machine upon the resetting of the operating machine when said machine resetting function is executed.

12. A backup switching control method according to one of claim 8, wherein said output of said disconnection completion notice is output upon completion of the disconnection independently of the executing of the dump process.

13. A backup switching system for a combination of first and second data processors, wherein a first processor is an operating processor and a second processor is a backup processor, said processors being connected to at least one system resource, wherein said operating processor exclusively occupies said system resource during a normal operation of said operating processor, comprising:

each of said operating and backup processors respectively having a main processor, an auxiliary processor, a shared memory connected for data exchange with each of said main and auxiliary, and a communication port;

means connecting said operating and backup processors through said communication ports;

said backup processor having means for detecting when a failure occurs in said operating processor;

said auxiliary processor having means operative in response to said detecting means detecting a failure in said operating processor for sending to said operating processor a command for releasing said system resource and for dumping data;

said operating processor having means responding to said sending means for dumping data being processed to a memory external of said operating processor and means for releasing said system resource independently of completion of dumping of data by said data dumping means, and means for transmitting a disconnection complete notice to said backup processor indicating that said system resource has been released by said operating processor; and said backup processor having means for receiving said notice and for exclusively occupying said system resource in response to receiving said notice.

14. A backup switching system as set forth in claim 13, wherein said means for releasing and said means for dumping data of said operating process or operate in parallel with one another.

15. A backup switching system as set forth in claim 13, wherein said system includes an auxiliary storage connected to said operating processor for storing data received by said data dumping means.

16. A backup switching system as set forth in claim 13, wherein said auxiliary processor of said operating processor stores said command for releasing said system resource and for dumping data being processed in said shared memory of said operating processor and further wherein said auxiliary processor has means for sending an interrupt to said main processor which responds by reading said shared memory for fetching said stored command.

17. A backup switching system as set forth in claim 13, wherein said communicating means is a network with a plurality of said combination of said first and second processors connected together by said network; and said system further including another plurality of system resources connected to said network that are exclusively occupied by said operating processors of said plurality of combination of processors under normal operation.

18. A backup switching system, comprising:

a plurality of combinations of first and second data processing machines connected to a network, wherein said first machines are operating machines and said second machines are backup machines, said machines of each said combination being connected to at least one system resource either directly or thorough said network, wherein said operating machines exclusively occupy said system resources during normal operation of said operating machines;

each of said operating and backup machines within each said combination respectively having a main processor, an auxiliary processor, a shared memory connected for data exchange with each of said main and auxiliary processors, and a communication port connected to said network;

each said backup machine having means for detecting when a failure occurs in a corresponding one of said operating machines in each said combination;

in each said backup machine, said auxiliary processor having means operative in response to said detecting means detecting a failure in said corresponding operating machine for sending to said corresponding operating machine a command for releasing said system resource and for dumping data;

each said operating machine having means responding to said sending means for dumping data being processed to a memory external of said operating machine and for releasing said system resource independently of completion of dumping of the data by said data dumping means, and means for transmitting a disconnection complete notice to said corresponding backup machine indicating that said system resource has been released by said operating machine; and each said backup machine having means for receiving said notice and for exclusively occupying said system resource after receiving said notice.

19. A backup switching system as set forth in claim 18, wherein said means for releasing and said means for dumping data of each of said operating machines operate in parallel with one another.

20. A backup switching system as set forth in claim 18, wherein said system includes an auxiliary storage connected to said operating machine for storing data received by said data dumping means.

21. A backup switching system as set forth in claim 18, wherein said auxiliary processor of each of said operating machines stores said command for releasing said system resource and for dumping data being processed and being stored in registers and in memory of said operating machine to an auxiliary storage, and further wherein each of said auxiliary processor has means for sending an interrupt to a corresponding said main processor which responds by reading said shared memory for fetching said stored command.

* * * * *